July 14, 1942.    C. S. SNAVELY ET AL    2,289,736
CIRCUIT CONTROLLER
Filed Feb. 28, 1941
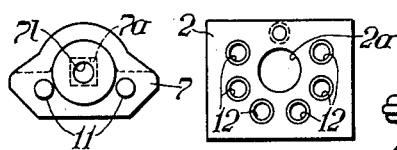
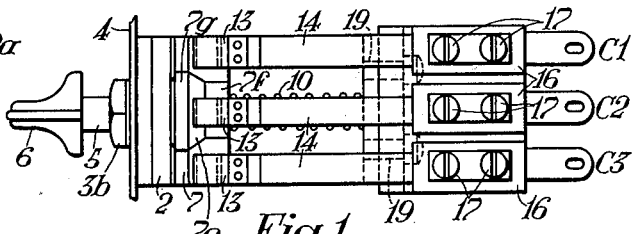
Fig. 4.   Fig. 5.   Fig. 1.
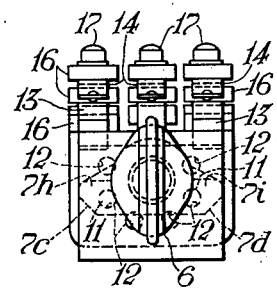
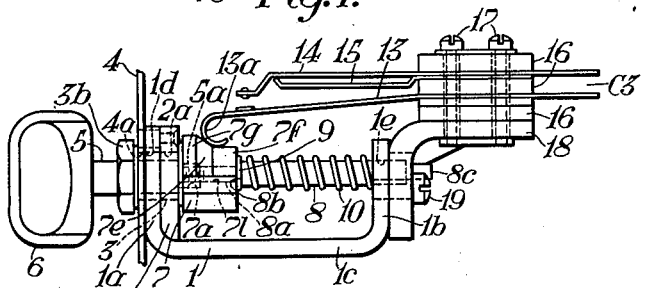
Fig. 3.   Fig. 2.
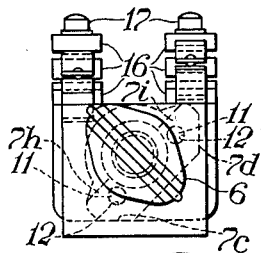
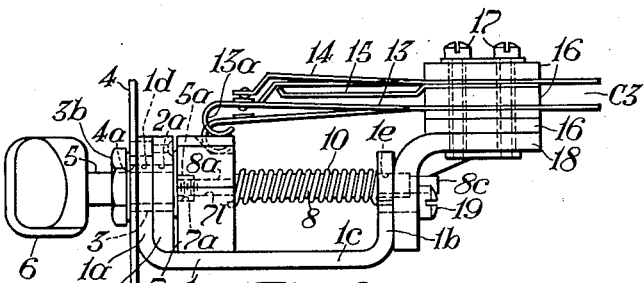
Fig. 7.   Fig. 6.
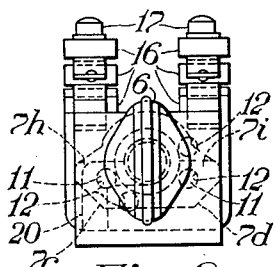
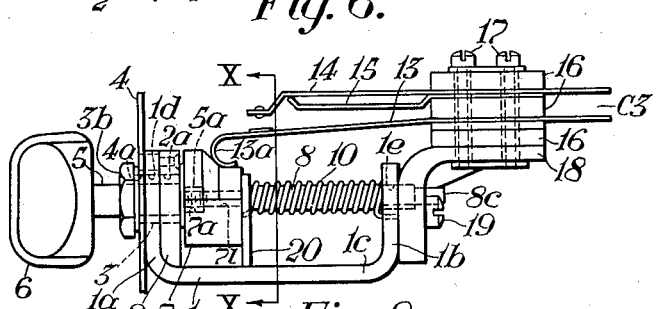
Fig. 9.   Fig. 8.
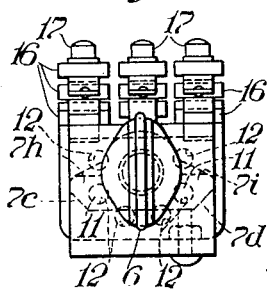
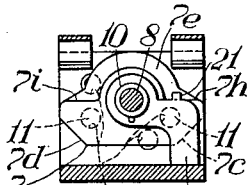
Fig. 11.   Fig. 10.
INVENTORS
Clarence S. Snavely
and Regis H. Zetwo
THEIR ATTORNEY Patented July 14, 1942

2,289,736

UNITED STATES PATENT OFFICE 2,289,736

CIRCUIT CONTROLLER

Clarence S. Snavely, Churchill, and Regis H. Zetwo, Swissvale, Pa., assignors to The Union Switch & Signal Company, Swissvale, Pa., a corporation of Pennsylvania Application February 28, 1941, Serial No. 381,062

8 Claims. (Cl. 200—1)

Our invention relates to circuit controllers, and particularly to circuit controllers for assembly on a control panel as one of a compact group of similar units for controlling railway switches and signals or other apparatus.

In certain forms of railway signaling systems, such, for example, as the Remote control system described and claimed in an application for Letters Patent of the United States, Serial No. 366,874, filed by Clarence S. Snavely, Alfred B. Miller and Arthur P. Jackel, on November 23, 1940, the control of the switches and signals is effected by means of circuit controllers mounted on a central control panel. These circuit controllers are commonly referred to as miniature levers, and each position of the circuit controller usually corresponds to a different condition of the device controlled by the circuit controller. In systems of the type described, it is desirable to insure that a lever position cannot be changed without first initiating a corresponding control, and one object of our invention is to provide a novel and improved circuit controller for effecting this result.

Another object of our invention is to provide a circuit controller of the type described which requires a minimum amount of space, and which can be constructed at a minimum cost, but which at the same time is readily accessible and has a construction which insures reliable operation.

According to one form of our invention, the circuit controller is provided with a single cam which is rotatable by the associated operating knob to different positions corresponding to the different controller positions, and which is also axially movable by the knob between two positions. The cam is biased to one axial position, and cooperates with one group of contacts which are operated when the came is moved axially to its other position, and with other contacts which are selectively operated in accordance with the position to which the cam is rotated The cam also carries latch means which are effective to latch the controller in any of its angular positions, and which acts to prevent rotation of the controller from one position to another unless the controller is first pushed to move the cam away from its axially biased position. The contacts which are operated when the controller is pushed are utilized to initiate the control of the device controlled by the controller.

According to another form of our invention, means are provided for latching the controller in one or more but not all of its positions, and for returning it by spring action to a selected position when it is moved to an unlatched position and then released.

Other objects and characteristic features of our invention will become apparent as the description proceeds.

We shall describe several forms of circuit controllers embodying our invention, and shall then point out the novel features thereof in claims.

In the accompanying drawing, Figs. 1, 2 and 3 are top plan, side elevational and front end views, respectively, showing one form of circuit controller embodying our invention. Figs 4 and 5 are detail views of parts of the circuit controller shown in Figs. 1, 2 and 3. Figs. 6 and 7 are side and left-hand end views, respectively, showing another form of circuit controller embodying our invention. Figs. 8 and 9 are side and end views, respectively, showing still another form of circuit controller embodying our invention. Fig. 10 is a view taken substantially on the line X—X of Fig. 8. Fig. 11 is a front end view showing a modification of the circuit controller illustrated in Figs. 1, 2 and 3.

Similar reference characters refer to similar parts in each of the several views.

Referring first to Figs. 1, 2 and 3, a circuit controller embodying our invention is here shown as comprising a supporting bracket 1 which may have any suitable form, but which in the particular form illustrated consists of a single strip of metal or other suitable material bent to form two spaced vertical portions 1a and 1b, and an intermediate connecting portion 1c. The vertical portion 1a is provided with a screw-threaded hole 1d which aligns axially with a hole 1e formed in the vertical portion 1b, and has riveted or otherwise secured to the rear face thereof a latch plate 2, the function of which will be made clear presently. The latch plate 2 is provided with a threaded hole 2a which forms a continuation of the threaded hole 1d, and screwed into the holes 1d and 2a is a bushing 3 which serves to secure the circuit controller to a mounting panel 4. The bushing 3 extends with clearance through a hole 4a formed in the mounting panel and is provided on the outside of the panel with a non-circular annular flange 3b to facilitate screwing the bushing in place. It will be obvious, of course, that the flange 3b forms a shoulder which engages the outer face of the mounting panel.

Extending through the bushing 3 with considerable clearance is an operating rod 5, the outer end of which is provided with an operating knob 6, and the inner end of which is provided with an internally screw-threaded squared portion 5a. The squared portion 5a fits snugly within a squared recess 7a provided in an operating cam 7, and is secured within the recess by means of a spring rod 8. The spring rod 8 is slidably mounted at one end in the opening 1e in the supporting bracket 1, and is provided at its other end with a portion 8a of reduced diameter which forms a shoulder 8b. The portion 8a extends through a hole 7l formed in the cam 7 in axial alignment with the recess 7a, and is screwed into the squared portion 5a of the operating rod, whereby the cam is securely clamped between the inner end of the operating rod and the shoulder 8b. A lock washer 9 is provided on the spring rod between the cam and the shoulder 8b to lock the parts in their assembled relation, and a squared portion 8c is formed on the outer end of the spring rod to facilitate screwing the spring rod into the operating rod.

The operating knob 6 may be secured to the operating rod in any suitable manner but is preferably moulded onto the operating rod.

The cam 7 is intended to be rotated by the operating knob 6 between an intermediate or central position in which it is shown in the drawing, a counterclockwise extreme position, as viewed in Fig. 3, in which a stop surface 7c formed on one wing 7h of the cam engages the top of the portion 1c of the bracket 1, and a clockwise extreme position, as viewed in Fig. 3, in which a stop surface 7d formed on another wing 7i disposed opposite the first mentioned wing engages the top of the portion 1c of the bracket 1. The cam 7 is also intended to be moved axially inwardly by the operating knob 6, in opposition to the bias of a spring 10, from an outer position in which the cam 7 engages the latch plate 2 to an inner position in which the operating knob 6 engages the outer end of the bushing 3. The biasing spring 10 surrounds the spring rod 8 between the washer 9 and the upstanding portion 1b of the bracket 1.

When the cam 7 occupies any one of its three outer positions, it is latched in the position which it then occupies by means of a pair of laterally spaced outwardly projecting pins 11 which enter aligned holes 12 formed in the previously described latch plate 2. The pins 11 are of such lengths that when the cam is moved inwardly to its inner extreme position, the pins will be completely withdrawn from the holes 12, and it follows, therefore, that before the cam can be rotated from one position to another it is first necessary to push the operating knob to its inner position, and that when the cam has thus been rotated to a new position and is released, the spring 10 will act to automatically move the cam to its corresponding outer position to thereby latch it in this position. To facilitate the entry of the pins into the holes 12 the outer ends of the holes may be countersunk and the outer ends of the pins rounded, as is obvious.

The circuit controller further comprises three contacts, one of which, C2, is disposed directly above the spring rod 8, and the remaining two of which, C1 and C3, are disposed on opposite sides of the contact C1. These contacts are all alike, and each comprises a movable finger 13 and a fixed finger 14 clamped between superposed insulating blocks 16 secured by means of screws 17 to the rearwardly projecting horizontal leg of an insulating L-shaped bracket 18, which bracket, in turn, is secured by means of screws 19 to the vertical portion 1b of the bracket 1.

Each finger 13 is provided at its outer end with a downwardly projecting return bend 13a which cooperates with the cam 7 in a manner which we shall make clear presently, and is biased by its own resiliency to a lower or open position in which it is out of engagement with the cooperating finger 14. Associated with each finger 14 is a relatively stiff metal stop 15 which is clamped between the same two blocks 16 as the finger, and which cooperates with the finger to position it when it is not being engaged by the associated finger 13.

The return bend 13a on the finger 13 of the contact C2 cooperates with the cam 7 at a central curved portion having an inclined cam face 7e disposed between high and low positions 7f and 7g. When the operating knob 6 occupies its outer position, the return bend 13a engages the low portion 7f and under these conditions the contact C2 is open. When, however, the operating knob is pushed inwardly to its inner position, the return bend 13a on this finger then rides up over the inclined cam face 7e onto the high portion 7g, which forces the finger upwardly into engagement with the finger 14 to thereby close the contact C2. The curved portion of the cam has an angular length which is greater than the length of the arc through which the operating knob can be rotated, and it follows, therefore, that when the operating knob occupies its inner position, the contact C2 will be closed regardless of the angular position which the knob then occupies.

The return bends 13a on the fingers 13 of the remaining two contacts C1 and C3 cooperate with the upper surfaces of the wings 7h and 7i in such manner that the wing 7h will engage the return bend 13a on the finger 13 of the contact C1 and lift this finger to the position in which it engages the associated fixed contact finger 14 to close the contact C1 when the operating knob is rotated to its clockwise extreme position as viewed in Fig. 3, and that the wing 7i will engage the return bend 13a on the finger 13 of the contact C3 and lift this latter finger to the position in which it engages the associated fixed contact finger 14 to close the contact C3 when the operating knob is rotated to its counterclockwise extreme position, as viewed in Fig. 3.

The operation of the circuit controller as a whole will be obvious from the foregoing description without further detailed description. It should be noted particularly, however, that due to the latch mechanism it is impossible to operate the circuit controller from one position to another without operating the contact C2.

The circuit controller thus far described is of the type commonly referred to as a three-position circuit controller. Under some conditions, it is desirable to provide a two-position circuit controller which becomes latched in one position only, and which automatically returns to said one position upon being released after being moved to its other position. For this purpose, the circuit controller may be constructed in the manner shown in Figs. 6 and 7. Referring to Figs. 6 and 7, as here illustrated, the one contact C2 has been omitted and the latch plate 2 is provided with only two holes 12, which holes align with the pins 11 when and only when the operating knob is rotated to its extreme counterclockwise position in which it is shown in Fig. 7. Furthermore, as here illustrated, the spring 10 is anchored at one end to the vertical position 1b of the bracket 1, and at the other end to the cam 7 in such manner that it is partly compressed, and is also under tension, whereby it is effective to bias the cam to its outer position and also to its counterclockwise extreme position. The other parts of the circuit controller shown in Figs. 6 and 7 are identical with the corresponding parts of the circuit controller shown in Figs. 1 to 5, inclusive.

With the circuit controller constructed as shown in Figs. 6 and 7, it will be obvious that the contact C1 or C2 will be closed according as the operating knob 6 occupies the position shown as its opposite extreme position. It will also be obvious that when the operating knob occupies the position shown, it will be latched in this position, so that it is necessary to push it from its outer position to its inner position before it can be rotated to its opposite extreme position. Moreover, it will be seen that since there is only one set of holes 12, when the operating knob is moved to its clockwise extreme position and released, the spring 10 will act to return it to the position shown and automatically latch it in this position.

Referring now to Figs. 8 and 9, we have here shown a further modified form of circuit controller embodying our invention in which the operating knob is latched in its center and counterclockwise positions only and is automatically returned from its clockwise position to its center position by spring action. As here illustrated, the latch plate is provided with two sets of holes 12 one set of which aligns with the pins 11 when and only when the lever occupies its central position in which it is shown in Fig. 9, and the other set of which aligns with the pins 11 when and only when the lever occupies its counterclockwise extreme position as viewed in Fig. 9. Rotatably mounted on the spring rod 8 between the cam and the adjacent end of the spring 10 is a spring stop 20. This stop is operatively connected at one end with the spring 10 in such manner that it is biased by the spring in a counterclockwise direction as viewed in Fig. 9, to the position in which its lower end engages the upper side of the bracket 1, and is provided with a laterally projecting lug 21 which, when the stop occupies its biased position and the operating knob occupies its center position, just touches the upper side of the wing 7h. It will be seen, therefore, that when the operating knob 6 is rotated in a clockwise direction as viewed in Fig. 9 from the position shown, the cam will engage the lug 21 and will thus cause the stop to rotate with the cam, whereby the spring is effective to bias the operating knob to its center position, but that when the knob is rotated in the opposite direction, the cam will move away from the lug 21, whereby under these latter conditions the spring is only effective to bias the cam to its outer axial position. It follows that with the circuit controller constructed as shown in Figs. 8, 9 and 10 when the operating knob is moved to its clockwise extreme position as viewed in Fig. 9 and released, the knob will automatically return to its center position, but that when it is moved to its counterclockwise extreme position and released, it will automatically become latched in this position. The operation of the contacts C1, C2 and C3 by the cam with the circuit controller constructed in Figs. 8, 9 and 10 is the same as with the circuit controller constructed in Figs. 1, 2 and 3.

One advantage of a circuit controller embodying our invention is that by making very slight changes in its construction a large number of different combinations can be obtained. For example, by adding to the three-position controller shown in Figs. 1, 2 and 3 a blocking device such as shown in Fig. 11 to prevent rotation of the operating knob past its central position in one direction or the other this controller can be converted from a three-position controller to a two-position controller. Likewise, the two-position controller shown in Figs. 6 and 7 can by a suitable arrangement of the holes in the latch plate be changed from a two-position controller which is normally latched in its counterclockwise extreme position as viewed in Fig. 7 and returns by spring action to this position when moved to its opposite extreme position, to a two-position controller which is normally latched in its clockwise extreme position and returns by spring action to this position when moved to its opposite extreme position. It will also be obvious that by omitting from the latch plate of the lever shown in Figs. 8, 9 and 10 the holes which cause the lever to become latched in its counterclockwise extreme position, as viewed in Fig. 9, and adding to this lever a second spring and stop combination, the stop of which would be mounted on the spring rod on the right-hand side of the stop 20, as viewed in Fig. 8, and the spring of which would surround the spring 10, this lever can be made to be spring return to its central position from either extreme position. It follows that by suitable changes the lever shown in Figs. 8, 9 and 10 can be constructed to provide the following combinations.

Normally latched central position—free movement to latched counterclockwise extreme position, spring return from clockwise position.

Normally latched central position—free movement to latched clockwise extreme position—spring return from counterclockwise extreme position.

Normally latched central position—movement to counterclockwise extreme position blocked—spring return from clockwise extreme position.

Normally latched central position—movement to clockwise extreme position blocked—spring return from counterclockwise extreme position.

Normally latched central position—spring return from either its clockwise or counterclockwise extreme position.

Another advantage of a circuit controller embodying our invention is that it provides a means for positively insuring a sequential contact operation which is very desirable for certain applications.

A further advantage of a circuit controller embodying our invention is that the latch means provided prevents accidental operation of the lever since two distinct motions are necessary to operate it from any latched position to any other position.

Although we have herein shown and described only a few forms of circuit controllers embodying our invention, it is understood that various changes and modifications may be made therein within the scope of the appended claims without departing from the spirit and scope of our invention.

Having thus described our invention, what we claim is:

1. A plural position circuit controller including a cam movable axially from one position to another and also rotatable between two angular positions, an operating member connected with said cam for moving it, means for biasing said cam to one axial position, latch means acting to prevent rotation of said cam from its one angular position to the other unless it is first moved to its other axial position, a first contact, a first cam surface formed on said cam and cooperating with said first contact to operate it when said cam is moved to its other axial position, a second contact, and means on said cam for operating said second contact when said cam is rotated to one of its angular positions.

2. A plural position circuit controller including a cam movable axially from an outer to an inner position and also rotatable about its axis between at least two angular positions, means for actuating said cam, spring means acting to bias said cam to one axial position, means for latching said cam against rotation in at least one of its angular positions when said cam occupies said one axial position but not its other axial position, whereby in order to rotate said cam from a latched position it is necessary to first move it axially to its other axial position, a first contact operated in response to movement of said cam to its other axial position by means of an inclined cam surface formed on said cam, and a second contact operated by said cam in response to its movement to one of said angular positions.

3. A plural position circuit controller comprising a cam axially movable between two positions and rotatable between at least two angular positions, an operating member connected with said cam for moving it, spring means for biasing said cam to its one axial position, a latch plate engaging said cam when it occupies said one axial position, pins on said cam entering holes provided in said latch plate when said cam occupies said one axial position and one of its angular positions, whereby said cam cannot be rotated from said one angular position unless it is first moved to its other axial position, a plurality of contacts each comprising a fixed finger and a movable finger, said contact fingers extending parallel to the axis of said shaft and each movable finger being provided at one end with a return bend, and means on said cam cooperating with said movable fingers at their return bends for operating a first one of said contacts when said cam is moved to its other axial position, a second one of said contacts when said cam is moved to its one angular position, and a third one of said contacts when said cam is moved to its other angular position.

4. A plural position circuit controller comprising a bracket, means for securing said bracket to a control panel comprising a bushing passing through the panel and secured to said bracket, a cam mounted in said bracket for axial movement between two positions and also for rotary movement between two angular positions, an operating member extending through said bushing and connected with said cam for operating it, said member being provided with an operating knob which engages said bushing to determine the one axial position of said cam, a latch plate secured to said bracket and cooperating with said cam to determine the other axial position of said cam, spring means for biasing said cam to its other axial position, latch means on said cam cooperating with latch means on said latch plate to prevent rotation of said cam away from at least one of its angular positions unless it is first moved to said one axial position, and contacts operated by said cam.

5. A plural position circuit controller comprising a supporting bracket consisting of a single piece of metal bent to form spaced vertical portions and an intermediate connecting portion, one of said vertical portions being provided with a screw-threaded hole which aligns axially with a hole provided in the other vertical portion, a latch plate secured to the rear side of said one vertical portion and provided with a threaded hole which forms a continuation of the screw-threaded hole in said one vertical portion, a mounting panel, means for securing said bracket to the rear side of said panel comprising a bushing passing through a hole in said panel and screwed into the screw-threaded holes in said one vertical portion and said latch plate, a cam provided in one side with a non-circular axial recess and with an axial hole extending therethrough from the inner end of said recess, an operating shaft extending through said bushing and provided at its inner end with a non-circular internally screw-threaded portion which fits said recess, a spring rod mounted at one end in the hole in said other vertical portion of said bracket and provided at the other end with a shoulder and with a reduced portion which extends through the hole in said cam and is screwed into the non-circular end of said operating rod whereby said cam is clamped between the inner end of said operating rod and said shoulder, an operating knob provided on the outer end of said operating rod and acting with said cam to limit axial movement of said cam to two positions, said cam being rotatable by said knob to at least two angular positions, a spring surrounding said spring rod between said cam and said other vertical portion of said bracket and acting to bias said cam to an outer axial position, pins on said cam adapted to enter holes provided in said latch plate when said cam is rotated to one angular position to prevent rotation of said cam away from said one angular position except when said cam is moved to its inner axial position, and contacts selectively operated by said cam.

6. A circuit controller comprising a supporting bracket, an operating shaft mounted for both longitudinal and rotating movement relative to said bracket, a spring rod secured to one end of said operating shaft and forming a continuation thereof, a cam secured to said operating shaft and movable thereby between two axial positions and also rotatable between an intermediate and two extreme positions, a spring stop loosely mounted on said spring rod adjacent said cam, a spring on said spring rod secured at one end to said bracket and at the other end to said stop and acting to bias said cam to one of its axial positions and said stop to one angular position, means on said stop cooperating with means on said cam whereby rotation of said cam from its intermediate position toward one extreme position will cause said stop to rotate in opposition to the bias of said spring but that said cam is free to rotate independently of said stop from its intermediate to its other extreme position and whereby said spring is effective to bias said cam from its one extreme position to its intermediate position, latch means effective to latch said cam in its intermediate and other extreme positions when said cam occupies its one axial position but not when it occupies its other axial position, whereby when said cam is rotated to its one extreme position and released it will automatically return to and become latched in its intermediate position, and contacts controlled by said cam.

7. A circuit controller comprising a supporting bracket, an operating rod mounted for both longitudinal and rotary movement relative to said bracket, a spring rod secured to one end of said operating rod and forming a continuation thereof, a cam secured to said operating rod by means of said spring rod and movable by said operating rod between two axial positions and also rotatable between two angular positions, means for biasing said cam to its one axial position, latch means on said cam for preventing rotation of said cam away from its one angular position except when it occupies its other axial position, a first contact operated by said cam in response to its longitudinal movement, and a second contact operated by said cam in response to its rotary movement.

8. A circuit controller comprising a supporting bracket, an operating rod mounted for both longitudinal and rotary movement relative to said bracket, a spring rod secured to one end of said operating rod and forming a continuation thereof, a cam secured to said operating rod by means of said spring rod and movable by said operating rod between two axial positions and also rotatable between two angular positions, a spring on said spring rod secured at one end to said cam and at the other end to said bracket and effective to bias said cam to one of its axial positions and also to one of its angular positions, latch means on said cam for preventing rotation of said cam away from its one angular position except when it occupies its other axial position, a first contact operated by said cam in response to its longitudinal movement, and a second contact operated by said cam in response to its rotary movement.

CLARENCE S. SNAVELY.
REGIS H. ZETWO.